No. 849,878. PATENTED APR. 9, 1907.
A. ZIVI.
HEATING APPARATUS FOR FLUIDS.
APPLICATION FILED NOV. 14, 1906.
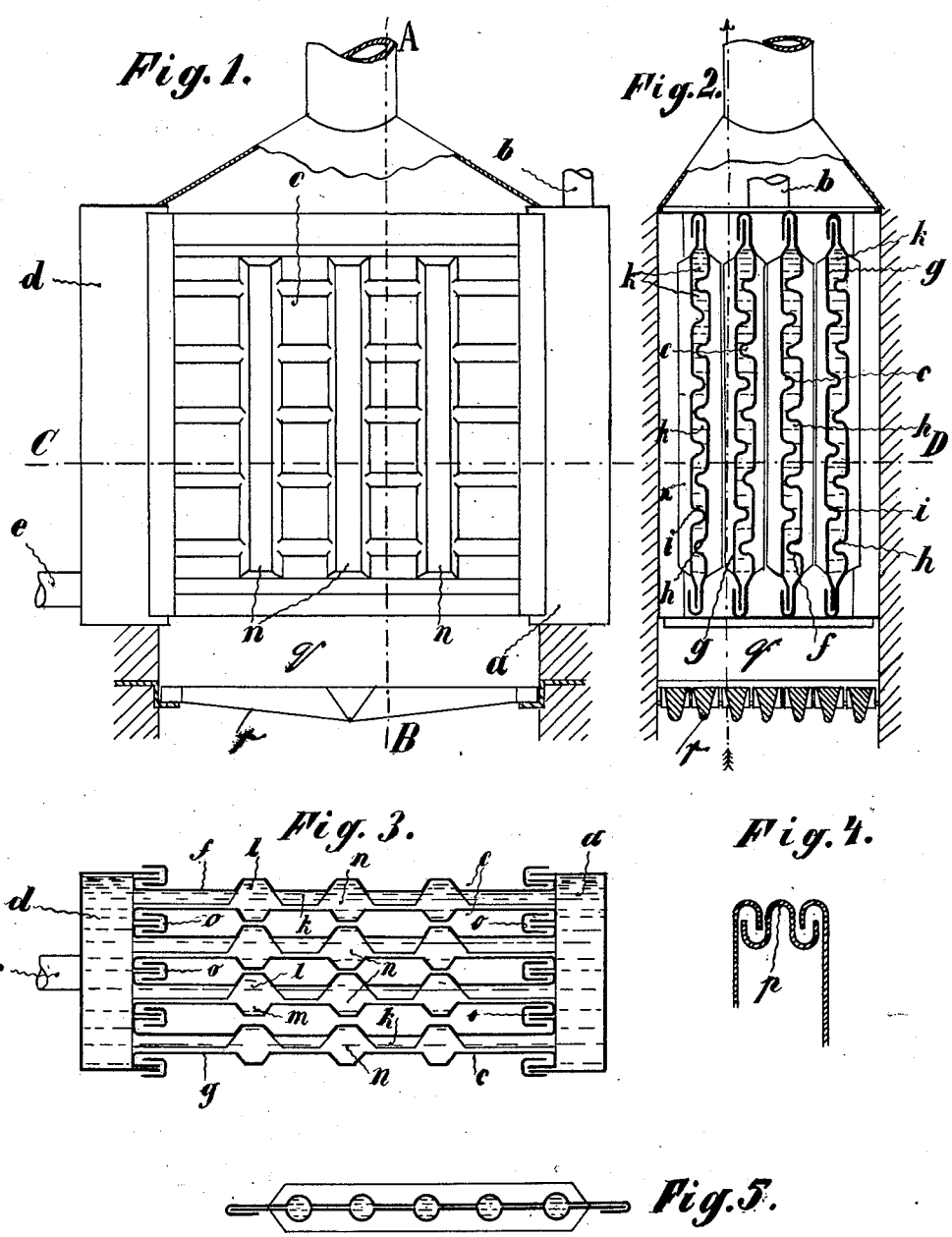

UNITED STATES PATENT OFFICE.

ADOLF ZIVI, OF MANNHEIM, GERMANY.

HEATING APPARATUS FOR FLUIDS.

No. 849,878.      Specification of Letters Patent.      Patented April 9, 1907.

Application filed November 14, 1906. Serial No. 343,465.

*To all whom it may concern:*

Be it known that I, ADOLF ZIVI, manufacturer, a citizen of Mannheim, and a subject of the Grand Duke of Baden, residing at Mannheim, Grand Duchy of Baden, in the Empire of Germany, have invented certain new and useful Improvements in Heating Apparatus for Fluids, of which the following is a full, clear, and exact description.

The present invention has for its object an apparatus composed of plates for heating water.

This heating apparatus is of the kind in which the water flows from an admission-reservoir through plates traversed by passages toward a discharge-reservoir, while the intervals between the heating-cells formed by each pair of connected plates are traversed by the hot gases.

In accordance with the invention, all the passages of each plate referred to above are connected at regular intervals by transverse passages, by which means, first, the heating-surface is increased; second, each plate is stiffened transversely; third, should a longitudinal passage become blocked at any place only the portion situated between the two adjacent transverse passages is rendered inoperative and not the whole passage, as hitherto. Further, owing to the large total free cross-section of the passages of the parallelly-arranged cells no appreciable deposit of water-furstone takes place, such as would impede the operation of the apparatus.

A constructional form of the object of the invention is illustrated, by way of example, in the accompanying drawings, in which—

Figure 1 shows the same in elevation. Fig. 2 represents a section on the line A B of Fig. 1. Fig. 3 represents a section on the line C D of Figs. 1 and 2. Fig. 4 shows in section a special resilient lap-joint between two heating-cells; and Figs. 5 and 6 illustrate, by way of example, two additional forms of plate suitable for employment in the present invention.

The cold water enters the admission-reservoir $a$, Figs. 1 and 3, through the pipe $b$, Fig. 1, flows through the heating-cells $c$ toward the discharge-chamber $d$, from which it issues through the pipe $e$. Each of the heating-cells $c$ consists of two plate walls $f$ and $g$, of which the longitudinal seams on both sides are formed by lapping and soldering. Lengthwise the plate walls are provided with appropriate protuberances $h$ and $i$, Fig. 2, staggered relatively to each other and which keep the plate walls apart in such a manner that a number of longitudinal passages $k$ are formed, which, as a whole, constitute a heating-cell. The water flows from the chamber $a$ toward the chamber $d$. The plates $f$ and $g$ are also provided with protuberances $l$ and $m$, which are provided across to the passages $k$ and arranged one to the other in such a manner as to form passages $n$, through which all the longitudinal passages $k$ of each heating-cell $c$ are connected one with the other at regular intervals. These transverse passages $n$ facilitate the circulation of the water, increase the heating-surface, and stiffen the plates in the transverse direction. This stiffening renders the heating apparatus proof against shocks and vibration, and in addition the transverse passages insures the advantage that should one of the longitudinal passages become blocked at any place only that portion of this longitudinal passage is rendered inoperative which is situated between the two immediately-adjacent transverse passages.

The heating-gases which are made in the furnace $q$, having the grate $r$, flow through the intervals between the separate heating-cells $c$, for example, in the direction indicated by the arrow in Fig. 2. As shown in Fig. 3, the separate heating-cells are connected one with the other by lap-jointing by means of U-shaped intermediate parts $o$. This method of jointing forms a very strong, but at the same time elastic, connection between the separate cells and presents the further advantage that each of the cells may be completely finished before they are assembled. If it is desired to obtain still further elasticity in the connection than the jointing members $o$ will permit of, a jointing member $p$, provided with an intermediate bend, is employed, as shown in Fig. 4.

The cells illustrated in Figs. 5 and 6 differ from those already described only by a modified arrangement and conformation of the longitudinal passages.

Having now particularly described and ascertained the nature of my said invention and in what manner the same is to be performed, I declare that what I claim is—

1. In a heating apparatus a series of pairs of plates, the plates of each pair being arranged a small distance apart, each plate having a plurality of ribs projecting into the space between said plates, two reservoirs tightly connected to all the plates, and open to the spaces between the plates of each pair, means for tightly connecting those edges of the plates of each pair not connected to the chambers, fluid-channels connected to said chambers, gas-passages between each two pairs of plates, means for producing hot gases, passages situated to lead such gases to the passages between the pairs of plates, another gas-passage situated to lead the gases away after having passed through the spaces between the pairs of plates, substantially as set forth.

2. In a heating apparatus a series of pairs of plates, the plates of each pair being arranged a small distance apart, each plate having a plurality of ribs projecting into the space between said plates, the arrangement of said ribs being such, that the ribs of one plate of each pair of plates enter the space between the ribs of the other plate, two reservoirs tightly connected to all the plates, and open to the spaces between the plates of each pair, means for tightly connecting those edges of the plates of each pair not connected to the chambers, fluid-channels connected to said chambers, gas-passages between each two pairs of plates, means for producing hot gases, passages situated to lead such gases to the passages between the pairs of plates, another gas-passage situated to lead the gases away after having passed through the spaces between the pairs of plates, substantially as set forth.

3. In a heating apparatus a series of pairs of plates, the plates of each pair being arranged a small distance apart, each plate having a plurality of ribs projecting into the space between said plates, two reservoirs tightly connected to all the plates, and open to the spaces between the plates of each pair, means for tightly connecting those edges of the plates of each pair not connected to the chambers, fluid-channels connected to said chambers, gas-passages between each two pairs of plates, means for producing hot gases, passages situated to lead such gases to the passages between the pairs of plates, another gas-passage situated to lead the gases away, having passed through the spaces between the pairs of plates, channels impressed into the plates in contrary direction to the said ribs and situated at an angle to the latter, substantially as set forth.

4. In a heating apparatus a series of pairs of plates, the plates of each pair being arranged a small distance apart, each plate having a plurality of ribs projecting into the space between said plates, the arrangement of said ribs being such, that the ribs of one plate of each pair of plates enter the space between the ribs of the other plate, two reservoirs tightly connected to all the plates, and open to the spaces between the plates of each pair, means for tightly connecting those edges of the plates of each pair not connected to the chambers, fluid-channels connected to said chambers, gas-passages between each two pairs of plates, means for producing hot gases, passages situated to lead such gases to the passages between the pairs of plates, another gas-passage situated to lead the gases away after having passed through the spaces between the pairs of plates, channels impressed into the plates in contrary direction to the said ribs and situated at an angle to the latter, substantially as set forth.

In witness whereof I subscribe my signature in presence of two witnesses.

ADOLF ZIVI.

Witnesses:
H. W. HARRIS,
JOS. H. LEUTE.